US010221940B2

(12) United States Patent
Wozniak

(10) Patent No.: US 10,221,940 B2
(45) Date of Patent: Mar. 5, 2019

(54) NEUTRAL STATE MOVEMENT PROTECTION FOR AN AUTOMATIC TRANSMISSION

(71) Applicant: Ford Global Technologies, LLC, Dearborn, MI (US)

(72) Inventor: Kenneth Paul Wozniak, Chelsea, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 293 days.

(21) Appl. No.: 15/292,644

(22) Filed: Oct. 13, 2016

(65) Prior Publication Data

US 2018/0106364 A1 Apr. 19, 2018

(51) Int. Cl.

| | |
|---|---|
| ***F16H 59/44*** | (2006.01) |
| ***F16H 61/02*** | (2006.01) |
| ***B60T 7/12*** | (2006.01) |
| ***B60T 8/24*** | (2006.01) |
| ***B60T 8/58*** | (2006.01) |
| ***B60T 13/74*** | (2006.01) |
| ***F16H 63/34*** | (2006.01) |
| ***F16H 63/48*** | (2006.01) |
| ***G07C 5/08*** | (2006.01) |
| *F16H 59/66* | (2006.01) |
| *F16H 59/74* | (2006.01) |

(52) U.S. Cl.

CPC ............ *F16H 61/0204* (2013.01); *B60T 7/12* (2013.01); *B60T 8/245* (2013.01); *B60T 8/58* (2013.01); *B60T 13/741* (2013.01); *F16H 59/44* (2013.01); *F16H 63/3425* (2013.01); *F16H 63/3458* (2013.01); *F16H 63/48* (2013.01); *G07C 5/0825* (2013.01); *B60T 2210/20* (2013.01); *F16H 2059/443* (2013.01); *F16H 2059/663* (2013.01); *F16H 2059/746* (2013.01); *F16H 2312/04* (2013.01)

(58) Field of Classification Search

CPC ............... F16H 59/44; F16H 2059/443; F16H 2059/663; F16H 2059/746; F16H 63/3425; F16H 63/3458; F16H 63/48; F16H 2312/04

See application file for complete search history.

(56) References Cited

U.S. PATENT DOCUMENTS

| | | | | |
|---|---|---|---|---|
| 8,103,420 | B2 | 1/2012 | Amisano et al. | |
| 8,876,658 | B2 | 11/2014 | Kazama et al. | |
| 9,233,666 | B2 | 1/2016 | Al-Regib et al. | |
| 2004/0239270 | A1* | 12/2004 | Sarraillon | B60L 15/2009 318/432 |
| 2008/0086252 | A1* | 4/2008 | Nakayama | B60T 7/122 701/80 |

* cited by examiner

*Primary Examiner* — Huan Le

(74) *Attorney, Agent, or Firm* — David Kelley; Brooks Kushman, P.C.

(57) ABSTRACT

A controller is provided to, in response to a speed of the vehicle exceeding an allowable speed based on a measured grade while the vehicle is running and in neutral or park, actuating a vehicle holding mechanism to stop the vehicle.

18 Claims, 2 Drawing Sheets

100
Push/Tow Button 60
Shift Lever 32
Ignition Key 50
34
Controller
48 Electronic Parking Brake
46
Warning Light 58
26
36 Park Gear
Gradient Sensor 54
38 Park Pawl
Brake 42
24
18 20 10
22 Differential
Gearbox
Torque Converter
12
Engine
16
28
Transmission
14
Brake 44
Speed Sensor 56
30

NEUTRAL STATE MOVEMENT PROTECTION FOR AN AUTOMATIC TRANSMISSION

TECHNICAL FIELD

This disclosure relates to the control and operation of an automatic transmission.

BACKGROUND

Automatic transmissions typically include logic to determine whether a vehicle is in motion and if that motion is proper. At times, this logic may not function when the transmission is in neutral or in park.

SUMMARY

According to one embodiment of this disclosure, a controller is provided and configured to, in response to a speed of the vehicle exceeding an allowable speed based on a measured grade while the vehicle is running and a shift lever in neutral or park, actuating a vehicle holding mechanism to stop the vehicle.

The actuating of a vehicle holding mechanism may include inducing a tie-up condition of a transmission.

Inducing a tie-up condition of a transmission includes engagement of at least two clutches such that movement of an output shaft of the transmission is inhibited.

The actuating of a vehicle holding mechanism may include application of an electronic parking brake.

The actuating of a vehicle holding mechanism includes engagement of a parking pawl with a parking gear, wherein the parking gear inhibits rotation of an output shaft of a transmission.

The system may include an indicator light disposed within the vehicle, wherein the indicator light is illuminated in response to the vehicle moving above a predetermined speed based on a measured road grade.

The system may include a push/tow button and associated logic, wherein actuating the vehicle holding mechanism is disabled in response to actuation of the push/tow button.

In another aspect of this disclosure, a method of preventing inadvertent movement of a vehicle includes, outputting a signal from a gradient sensor, outputting a signal from a speed sensor, and initiating a command to stop the vehicle in response to the speed and gradient signals.

The method may further include actuating a stopping mechanism may be defined by inducing a transmission tie-up.

The method may further include actuating an electronic parking brake in response to the command.

The method may also include activation of a park-by-wire mechanism in response to the command to stop the vehicle.

In yet another embodiment of the disclosure, a system for a vehicle including a controller is described, the controller is configured to, in response to the vehicle moving in a direction opposite to a direction indicated by a road grade sensor while the vehicle is running and in neutral or park, actuating a vehicle holding mechanism to stop the vehicle.

The actuating of a vehicle holding mechanism may include inducing a tie-up condition of a transmission.

Inducing a tie-up condition of a transmission includes engagement of at least two clutches such that movement of an output shaft of the transmission is inhibited.

The actuating of a vehicle holding mechanism may include application of an electronic parking brake.

The actuating of a vehicle holding mechanism includes engagement of a parking pawl with a parking gear, wherein the parking gear inhibits rotation of an output shaft of a transmission.

The system may further include a push/tow button and associated logic, wherein the button may be actuated, wherein actuating the vehicle holding mechanism is disabled in response to actuation of the push/tow button.

The system may further include an indicator light disposed within the vehicle, wherein the indicator light is illuminated in response to the vehicle moving above a predetermined speed on a road above a grade threshold.

The system may include an indicator light disposed within the vehicle, wherein the indicator light is illuminated in response to the vehicle moving above a predetermined speed on a road above a grade threshold.

The indicator light may be illuminated in response to a setting of a diagnostic code.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Inadvertent movement of a vehicle may occur if the parking pawl is not engaged with a parking gear or abnormal clutch drag occurs. Clutch drag is a phenomenon where the clutch disk fails to disengage completely, resulting in movement of the vehicle while it is in neutral or park. Failure of a park-by-wire mechanism or a broken gear within the transmission may also cause inadvertent movement of a vehicle. Vehicles equipped with automatic transmissions typically include sensors, a controller, or computer, and associated logic to prevent inadvertent movement of a vehicle. A speed sensor capable of detecting the velocity of the vehicle and the direction the vehicle is traveling is used. A controller may not be able to differentiate between intentional and unintentional movement when the vehicle is running and placed in park or neutral.

One method to prevent inadvertent movement of a vehicle is by way of a grade sensor and a directional-speed sensor. A grade sensor has the capability of detecting the grade of the road at a fixed location with respect to the vehicle. A directional speed sensor is also used to determine whether the vehicle is moving, in what direction, and at what speed the vehicle is moving. For instance, if the vehicle is placed in park or in neutral a grade sensor detects the on a relatively flat surface and a speed sensor determines the vehicle is moving at a speed, a controller may be used to determine whether the speed is greater than expected for a given grade. After determining the movement of the vehicle is above a specified speed for a given grade, steps to stop the vehicle will be taken. A controller may be used to send a signal stop the vehicle in response to a determination of inadvertent movement. The vehicle may be stopped in various ways; application of a parking brake or emergency brake, inducing a tie-up condition within the transmission, or a parking pawl may be actuated to engage a parking gear within the transmission. In response to this condition, a fault code may be set by a controller and a warning light may be illuminated to warn a driver of the current condition.

Figure 1:
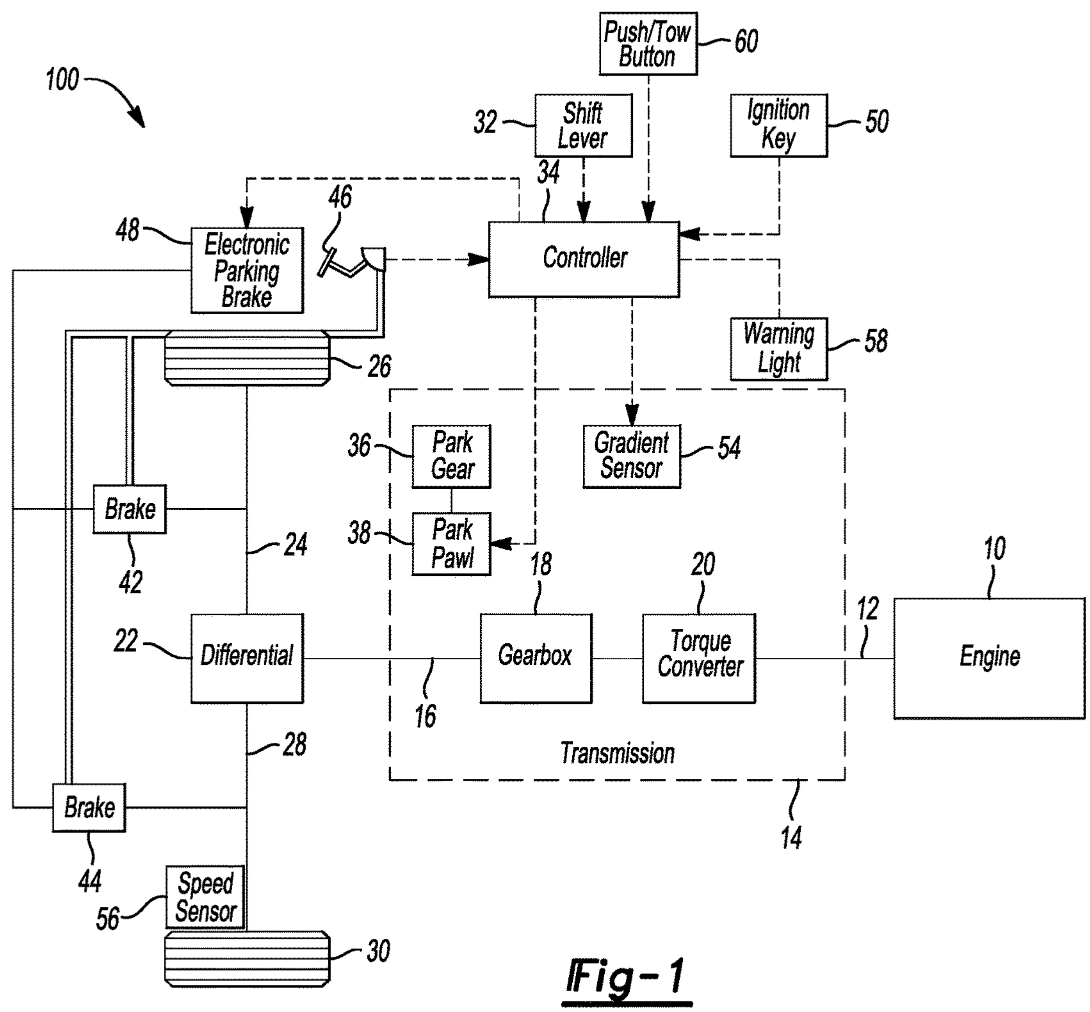
FIG. 1 is schematic diagram of a vehicle powertrain and braking mechanism.

FIG. 1 is a schematic diagram illustrating a vehicle powertrain. Mechanical connections are illustrated by solid lines and dashed lines represent control signals. The powertrain includes power generating components (i.e., engines or electric motors) and the drivetrain. The drivetrain is the group of components that deliver power to the driving wheels, excluding the power generating components. In contrast, the powertrain is considered to include both the power generating components and the drivetrain. The powertrain includes an engine 10 and a transmission 14.

The engine 10 may be an internal combustion engine that creates mechanical power that is transmitted through the crankshaft 12. A transmission 14 transfers power from crankshaft 12 to the transmission output shaft 16. The transmission output shaft 16 rotates at a speed that is proportional to the vehicle speed. The speed of the engine may significantly differ from the speed of the transmission output shaft. At low vehicle speed, transmission 14 reduces the speed and multiplies the torque for improved performance. At high vehicle speed, transmission 14 permits the engine to operate at a lower speed for fuel efficient cruising. Transmission 14 includes a gearbox 18 which establishes a variety of forward speed ratios and at least one reverse speed ratio. The transmission 14 also includes a launch device such as a torque converter 20. The torque converter is capable of transmitting torque while the driveshaft is stationary to launch the vehicle. The differential 22 divides and transmits the power from the transmission output shaft 16 between a left axle shaft 24 that drives a left wheel 26 and a right axle shaft 28 driving a right wheel 30. In a rear wheel drive configuration, the differential is typically connected to the transmission output shaft 16 by a driveshaft. In a front wheel drive configuration, the differential is typically integrated with the transmission.

Still referring to FIG. 1, the gearbox 18 includes a gearing arrangement. A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

The transmission 14 is controlled by manipulating a transmission control device such as a shift lever 32. The shift lever 32 is used to select the transmission gears. For example, when the driver selects either the Drive or Reverse gear, the controller 34 initiates engagement of a number of clutches within the gearbox 18 to establish the transfer of power at an intended speed. When the driver selects the Neutral or Park gear, the controller 34 provides a command to disengage a number of clutches such that power is not transmitted from the transmission to the wheels. The powertrain further includes an associated controller 34 such as a powertrain control unit (PCU). While illustrated as one controller, the controller 34 may be part of a larger control system and may be controlled by various other controllers throughout the vehicle 100, such as a vehicle system controller (VSC). It should therefore be understood that the controller 34 and one or more other controllers can collectively be referred to as a "controller" that controls various actuators in response to signals from various sensors to control functions such as starting/stopping engine 10, select or schedule shifts of the transmission 14, transition the transmission 14 to the desired gear based on an input from the shift lever 32, open/close the torque converter 20, etc. The controller 34 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 10 or vehicle 100.

Control logic or functions performed by the controller 34 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but are provided for ease of illustration and description. The control logic may be implemented primarily in software executed by a microprocessor-based vehicle, engine, and/or powertrain controller, such as controller 34. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The movement of the vehicle and powertrain may be monitored and controlled via a number of sensors and the controller 34 with associated logic. A gradient sensor or inclination sensor 54 is used to determine the pitch and roll of the vehicle 100. More specifically, the gradient sensor 54 is able to determine the grade of the road on which the vehicle is located. For instance, if the vehicle is on a hill, the gradient sensor 54 is configured to determine the angle or grade of the road at that fixed position. The gradient sensor 54 does not necessarily have to be placed within the transmission 14, as depicted. The gradient sensor 54 may be placed anywhere within the vehicle so long as it is capable of measuring the pitch and roll of the vehicle 100. The gradient sensor 54 provides a signal of the pitch and roll of the vehicle 100 to the controller 34. A speed sensor 56 is configured to detect the speed as well as the direction of the vehicle 100. The speed sensor 56 may be a wheel speed sensor, a speedometer, an airspeed indicator, LIDAR sensor, or a ground speed radar sensor, among others. The speed sensor 56 is configured to provide a speed and direction to the controller 34.

Stopping the vehicle may be implemented by a number of different ways. One such way is by using a park-by-wire method. The park-by-wire method involves a park gear 36 coupled to the transmission output shaft 16 and a park pawl 38 pivotally connected adjacent to the park gear 36. The controller 34 provides a command to engage or disengage the park pawl with the park gear. When the shift level is in any position other than Park, controller 34 commands park pawl 38 to a non-Park position in which it does not engage with park gear 36 and output shaft 16 is free to rotate. In a Park position, park pawl 38 engages park gear 36 holding output shaft 16 against rotation. As long as the downstream components of the powertrain are intact and the wheels have traction, holding the transmission output shaft stationary holds the vehicle stationary. If output shaft 16 is rotating above a ratchet speed when park pawl 38 is moved to the Park position, park pawl 38 does not immediately engage park gear 36 but instead bounces off the park gear, called ratcheting, until the vehicle slows enough that the park pawl drops into engagement. This feature prevents sudden stopping of the output shaft at high vehicle speed if a driver accidentally moves the shift lever to Park. Position sensor 40 indicates to the controller which of the two positions park pawl 38 is presently in, permitting controller 34 to verify that the pawl has moved as commanded. Park pawl 38 is designed to remain in its present position in the absence of commands from controller 34. Parking and or stopping a vehicle may be implemented by the use of the transmission 14 and the gearbox 18 within the transmission 14. The controller 34 may initiate a signal to induce a tie-up condition within the transmission 14. A tie up condition occurs when two or more gears within a transmission are actuated such that they are locked and movement is no longer allowed.

Parking a vehicle may also be implemented by the use of friction brakes. A vehicle may include brakes 42 and 44 to slow the left axle 24 and the right axle 28. These are hydraulically actuated by depressing the brake pedal 46. Finally, the vehicle includes an electronic park brake (EPB) 48. The EPB is mechanically connected to both brake 42 and 44 and engages both wheel brakes in response to a signal from the controller 34, independently of the position of the brake pedal 46. Although electrical power is required to apply the EPB, the EPB is designed to remain in the applied position restraining the rear wheels from rotation without electrical power. The driver can command either application or release of EPB 48. However, controller 34 is not configured to command release of the EPB. Normally, the controller is powered on when ignition key 50 is turned to an ON position and powered off when the ignition key is turned to an OFF position. However, the controller 34 can delay the shutdown process in some circumstances. A warning or indicator light 58 within the vehicle cabin may be illuminated in response to the inadvertent movement and stopping the vehicle.

The actuation of a vehicle holding mechanism may be disabled by actuating a Push/Tow Button 60 within the vehicle. The Push/Tow Button is electrically connected to the controller 34. If a user desires to push or tow the vehicle and the vehicle is running and in neutral, the Push/Tow Button 60 may be actuated to prevent the vehicle from being stopped while it is being towed or pushed.

Figure 2:
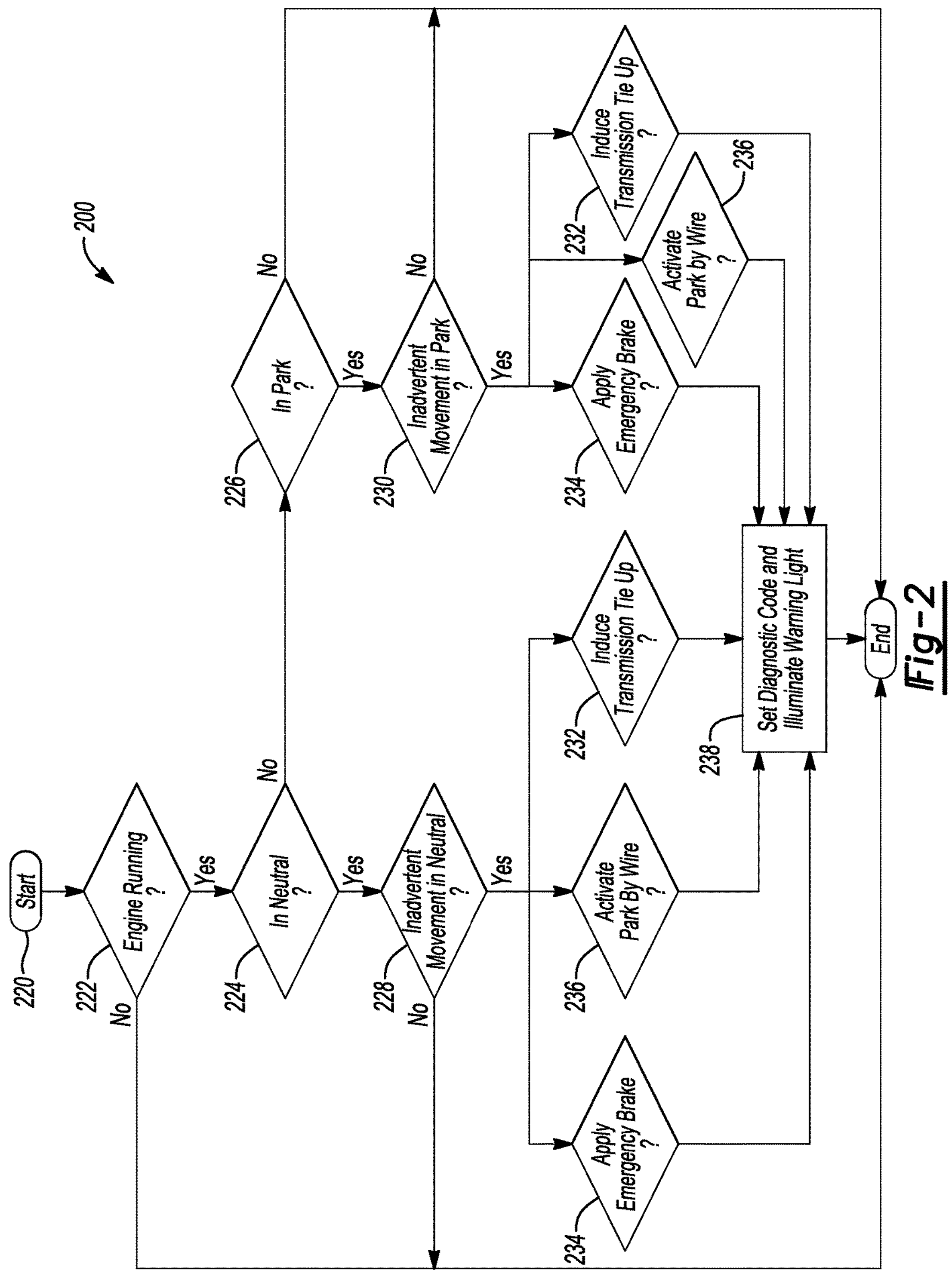
FIG. 2 is a flow chart for a method of preventing inadvertent movement of a vehicle.

FIG. 2 is a flow chart for the method 200 used by the controller 34 to inhibit inadvertent movement of the vehicle 100. At an initial state step 220, the process begins. At step 222, the controller 34 detects whether the engine 10 is running. At steps 224 and 226, the controller determines whether the vehicle is in neutral or park. If the vehicle is not in neutral or park, the transmission is able to transmit power to the vehicle axles and wheels 26 and 30. At step 228, the controller in conjunction with the speed sensor 56 and grade sensor 54 determines the pitch or roll of the vehicle at a fixed location. Upon detection of the gear, direction, and speed of the vehicle, the controller 34 determines if there is inadvertent movement. Inadvertent movement may be detected when the vehicle is placed on an incline or decline and the vehicle moves in a direction opposite to a direction that is probable for a given grade. Inadvertent movement may also occur when the vehicle is moving along a probable direction as indicated by the inclinometer or grade sensor 54, at a greater than allowable speed as detected by the speed sensor. The allowable speed is preferably one that is calculated as being greater than what is physically possible due only to the grade of the road.

In response to the detection of inadvertent movement while in park at step 230, the controller initiates a command to actuate a vehicle-park mechanism. The actuation of a vehicle-park mechanism may include the inducement of transmission tie-up at step 232. In addition or in lieu of inducing transmission tie-up, the controller 34 may provide a signal to apply to the electronic emergency brake at 234. In response to inadvertent movement while the vehicle is in neutral at step 228 or while the vehicle is in park at step 230, the controller may initiate a signal to activate park-by-wire at step 236. The inducement of a tie-up condition 232 and application of the emergency brake 234 may also be initiated in response to inadvertent movement. The use of an emergency brake may include actuating of an electronic parking brake (EFB). In response to the actuation of a vehicle-park mechanism, the controller 34 may send a signal to set a diagnostic code to indicate inadvertent movement of the vehicle 100. A warning or indicator light 58 within the vehicle cabin may be illuminated along with setting a diagnostic code in response to the inadvertent movement and stopping the vehicle.

It should be understood that the flowchart in FIG. 2 is for illustrative purposes only and that the method 200 should not be construed as limited to the flowchart in FIG. 2. Some of the steps of the method 200 may be rearranged while others may be omitted entirely.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for a vehicle comprising:

a controller configured to, in response to a speed of the vehicle exceeding an allowable speed based on a measured road grade while an engine is running and a shift lever is in a neutral or park position, actuating a vehicle holding mechanism to stop the vehicle.

2. The system of claim 1, wherein the actuating of the vehicle holding mechanism includes inducing a tie-up condition of a transmission.

3. The system of claim 2, wherein the inducing the tie-up condition of the transmission includes engagement of at least two clutches such that movement of an output shaft of the transmission is inhibited.

4. The system of claim 1, wherein the actuating of the vehicle holding mechanism includes application of an electronic parking brake.

5. The system of claim 1, wherein the actuating of the vehicle holding mechanism includes engagement of a parking pawl with a parking gear, wherein the parking gear inhibits rotation of an output shaft of a transmission.

6. The system of claim 1, further comprising an indicator light disposed within the vehicle, wherein the indicator light is illuminated in response to the vehicle moving above a predetermined speed based on the measured road grade.

7. The system of claim 1, further comprising a push/tow button and associated logic, wherein actuating the vehicle holding mechanism is disabled in response to actuation of the push/tow button.

8. A method of preventing inadvertent movement of a vehicle while running with neutral or park selected comprising:

outputting a signal from a gradient sensor;

outputting a signal from a speed sensor; and initiating a command to stop the vehicle in response to the speed and gradient signals wherein the command causes engagement of at least two clutches to induce a transmission tie-up.

9. The method of claim 8, wherein an emergency brake is actuated in response to the command.

10. The method of claim 8, wherein a park-by-wire mechanism is activated in response to the command.

11. The method of claim 8, further comprising setting of a diagnostic code.

12. A system for a vehicle comprising:

a controller configured to, in response to the vehicle moving in a direction opposite to a direction indicated by a road grade sensor while the vehicle is running and a shift lever is in a neutral or a park position, actuating a vehicle holding mechanism to stop the vehicle; and a push/tow button and associated logic, wherein actuating the vehicle holding mechanism is disabled in response to actuation of the push/tow button.

13. The system of claim 12, wherein the actuating of the vehicle holding mechanism includes inducing a tie-up condition of a transmission.

14. The system of claim 13, wherein the inducing the tie-up condition of the transmission includes engagement of at least two clutches such that movement of an output shaft of the transmission is inhibited.

15. The system of claim 12, wherein the actuating of the vehicle holding mechanism includes application of an electronic parking brake.

16. The system of claim 12, wherein the actuating of the vehicle holding mechanism includes engagement of a parking pawl with a parking gear, wherein the parking gear inhibits rotation of an output shaft of a transmission.

17. The vehicle system of claim 12, further comprising an indicator light disposed within the vehicle, wherein the indicator light is illuminated in response to the vehicle moving above a predetermined speed based on a measured road grade.

18. The vehicle system of claim 17, wherein the indicator light is illuminated in response to a setting of a diagnostic code.

* * * * *